(12) United States Patent     (10) Patent No.:    US 12,607,376 B2

Wodrich et al.        (45) Date of Patent:     Apr. 21, 2026

(54) SMART THERMOSTAT

(71) Applicant: Google LLC, Mountain View, CA (US)

(72) Inventors: Justin Wodrich, Los Gatos, CA (US);
Sung Kyun Bai, San Jose, CA (US);
Dongkyu Lee, Castro Valley, CA (US);
Phan Thao Benno Dang, San
Francisco, CA (US); William Dong,
Orange, CA (US); Eun Hee Jo, San
Jose, CA (US)

(73) Assignee: Google LLC, Mountain View, CA (US)

( * ) Notice: Subject to any disclaimer, the term of this
patent is extended or adjusted under 35
U.S.C. 154(b) by 94 days.

(21) Appl. No.: 18/616,681

(22) Filed: Mar. 26, 2024

(65)        Prior Publication Data

US 2025/0305698 A1     Oct. 2, 2025

(51) Int. Cl.
*F24F 11/50*        (2018.01)
*F24F 11/52*        (2018.01)
*G06F 3/0362*     (2013.01)

(52) U.S. Cl.
CPC ............ *F24F 11/52* (2018.01); *G06F 3/0362*
(2013.01)

(58) Field of Classification Search
CPC ........... F24F 11/50; F24F 11/52; F24F 11/523
See application file for complete search history.

(56)        References Cited

U.S. PATENT DOCUMENTS

| | | |
|---|---|---|
| 10,066,848 B1 | 9/2018 | Lorenz et al. |
| 2012/0203379 A1 | 8/2012 | Sloo et al. |

| | | | |
|---|---|---|---|
| 2014/0222220 A1* | 8/2014 | Fadell | G06F 3/04847 |
| | | | 700/278 |
| 2014/0358293 A1 | 12/2014 | Fadell et al. | |
| 2015/0100166 A1 | 4/2015 | Baynes et al. | |
| 2017/0059900 A1 | 3/2017 | Giustina | |
| 2017/0060369 A1 | 3/2017 | Goyal et al. | |
| 2018/0136677 A1 | 5/2018 | Marschalkowski et al. | |
| 2019/0155232 A1 | 5/2019 | Fadell et al. | |
| 2020/0109872 A1 | 4/2020 | Matsuoka | |
| 2022/0390134 A1 | 12/2022 | Chung et al. | |

FOREIGN PATENT DOCUMENTS

| | | |
|---|---|---|
| CN | 202256941 U | 5/2012 |
| CN | 110492879 A | 11/2019 |
| WO | 2015148596 A1 | 10/2015 |
| WO | 2022103755 A1 | 5/2022 |

* cited by examiner

*Primary Examiner* — Jonathan Bradford

(74) *Attorney, Agent, or Firm* — Lerner David LLP

(57)          ABSTRACT

A smart thermostat includes a housing having a cylindrical
sidewall, a domed lens, and a ring mounted to the sidewall
of the housing, a wireless network interface housed by the
housing, and an electronic display including a display frame.
The electronic display is housed by the housing such that the
electronic display is visible through the domed lens. The
smart thermostat further includes a processing system,
including one or more processors, housed by the housing,
that is in communication with the wireless network interface
and the electronic display and a backplate for mounting the
housing to a surface. A method for interacting with a smart
thermostat includes determining, by a smart thermostat, that
a user is present in a vicinity of the smart thermostat and
activating an electronic display of the smart thermostat in
response to determining that the user is present in the
vicinity of the smart thermostat.

20 Claims, 12 Drawing Sheets

400

402

402

402

400

SMART THERMOSTAT

BACKGROUND

A thermostat is used to control the operation of a heating system, cooling system, or both. Users can benefit from using an electronic device that can communicate via a wireless network with a cloud-based server. Such wireless network connectivity can allow for the thermostat to be controlled remotely by a user, such as via an application executed on a user's mobile device. The more straightforward and easy to interact with an electronic device is, the more likely users will desire to interact with the smart thermostat and take advantage of its features.

SUMMARY

According to one embodiment, a smart thermostat includes a housing having a cylindrical sidewall, a domed lens, and a ring mounted to the sidewall of the housing, a wireless network interface housed by the housing, and an electronic display including a display frame. The electronic display is housed by the housing such that the electronic display is visible through the domed lens. The smart thermostat further includes a processing system, including one or more processors, housed by the housing, that is in communication with the wireless network interface and the electronic display and a backplate for mounting the housing to a surface.

The smart thermostat may include various optional embodiments. The smart thermostat may further include one or more temperature sensors, housed by the housing, in communication with the processing system. The smart thermostat may further include a clip for coupling the ring and the display frame. The clip may act as an axial constraint for the smart thermostat. The clip, the display frame, and the ring may be assembled such that a gap is formed between an outer perimeter of the domed lens and a corresponding internal perimeter of the ring. The display frame may include a grease trap recess for directing grease between the display frame and the clip. The ring may rotate relative to the sidewall and the backplate when the smart thermostat is mounted to the surface for selecting one or more icons displayed on the electronic display. The ring may include an inner diameter and an outer diameter where both the inner diameter and the outer diameter are larger than a diameter of the sidewall of the housing. The smart thermostat may further include a sensor board and a magnetic strip for detecting rotation of the ring. The smart thermostat may further include grease applied between a vertical interface of the display frame and the ring for continuous rotation of the ring relative to the sidewall and the backplate without disruption. The ring may include polished stainless steel and a finish applied using physical vapor deposition (PVD). The domed lens may be a reflective cover positioned such that the electronic display is viewed through the reflective cover. The reflective cover may be continuous over an entirety of the domed lens such that no gaps, holes, lenses, or other discontinuities are present within the domed lens. The ring may be inwardly clickable for selecting an action displayed on the electronic display. Actuating the action may include rotating the ring to select the action and inwardly clicking the ring to actuate the action.

According to another embodiment, a method for interacting with a smart thermostat includes determining, by a smart thermostat, that a user is present in a vicinity of the smart thermostat and activating an electronic display of the smart thermostat in response to determining that the user is present in the vicinity of the smart thermostat such that a user interface is visible through a reflective cover covering the electronic display. The method further includes displaying, by the electronic display, a plurality of icons, receiving, by the smart thermostat, user input via rotation of a ring surrounding the electronic display for selecting an icon and inward clicking of the ring, and performing, by the smart thermostat, a function based at least in part on the selection of the icon.

The method may include various optional embodiments. The ring may rotate relative to the electronic display when the smart thermostat is mounted to a surface for selecting one or more icons displayed on the electronic display. The smart thermostat may include a sensor board and a magnetic strip for detecting rotation of the ring. The reflective cover may be continuous over an entirety of a domed lens such that no gaps, holes, lenses, or other discontinuities are present within the domed lens. The reflective cover may have a reflectivity sufficient to produce a mirrored effect when viewed and a transmissivity sufficient to allow illuminated portions of an electronic display of the smart thermostat to be visible when viewed through the reflective cover. An edge of the electronic display is not visible through the reflective cover.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

An electronic device refers to a thermostat that can communicate via a network and allows a user to interact with the smart thermostat from a remote location, such as via a mobile device (e.g., smartphone, tablet computer, desktop computer, laptop computer, etc.). Additionally, or alternatively, an electronic device has advanced features such as sensing as to whether any persons are in the vicinity of the smart thermostat and adjusting a setpoint temperature of the thermostat based on the sensed occupancy.

When an electronic device is installed, such as in a user's home, the user may desire that the smart thermostat be relatively easy to interact with and is also aesthetically pleasing. Various embodiments of the present disclosure provide an electronic device having an enlarged display for increased user visibility of available selections on the smart thermostat. Furthermore, at least some embodiments of the present disclosure, optimize a height of the smart thermostat (e.g., measured from a surface that the smart thermostat is mounted to a display surface closest to a user facing the smart thermostat) by compact assembly of the internal components.

The smart thermostat may have a mirrored cover on a face of the thermostat. When the electronic display is turned off, the mirrored cover may have the visual effect of appearing to be a mirror to a user viewing the face of the thermostat. When the electronic display is illuminated, the mirrored cover has a sufficient transmissivity to allow the illuminated portion of the electronic display to be viewed by the user through the cover. In some embodiments, the cover does not have any cutouts, holes, lenses, or variations on the front surface that could be visible to the user.

Figure 1:
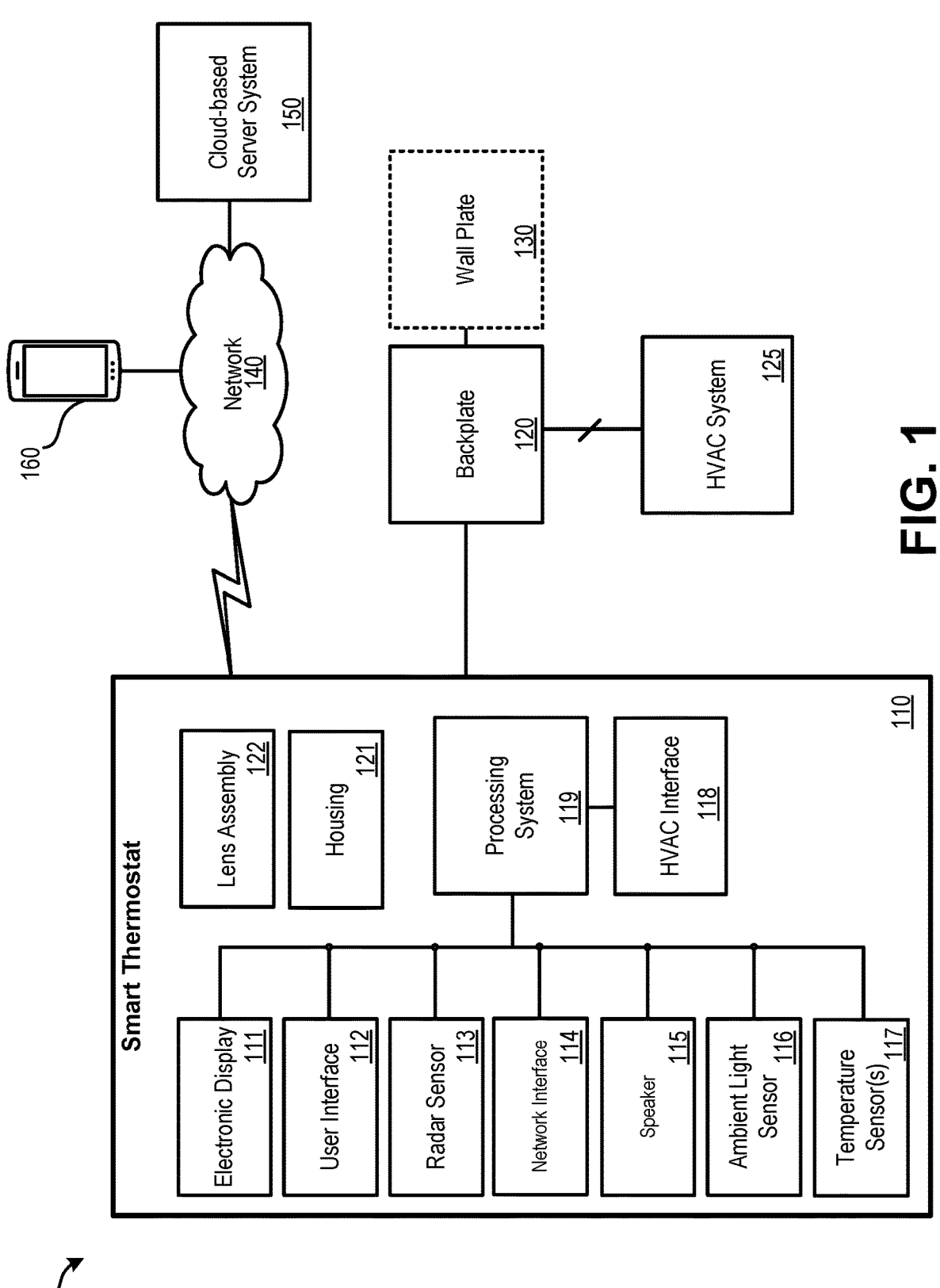
FIG. 1 is a block diagram of a smart thermostat system, in accordance with one embodiment of the present disclosure.

The figures and following description provide additional detail. FIG. 1 is a block diagram of an embodiment of a smart thermostat system. Smart thermostat system 100 can include smart thermostat 110; backplate 120; heating, ventilation, and air conditioning system (HVAC) 125; wall plate 130; network 140; cloud-based server system 150; and computerized device 160. Smart thermostat 110 represents embodiments of the thermostats detailed herein. Thermostat 110 can include: electronic display 111; user interface 112; radar sensor 113; network interface 114; speaker 115; ambient light sensor 116; one or more temperature sensors 117; HVAC interface 118; processing system 119; housing 121; and lens assembly 122.

Electronic display 111 may be visible through lens assembly 122. In some embodiments, electronic display 111 is only visible when electronic display 111 is at least partially illuminated. In some embodiments, electronic display 111 is a touch screen which can allow electronic display 111 to serve as a user interface to receive input. If a touch screen, electronic display 111 can allow one or more gestures, including tap and swipe gestures, to be detected. In some embodiments, the electronic display 111 may include a touch sensor such as a capacitive sensor that includes multiple electrodes positioned within a side wall of the housing 121.

User interface 112 can be various forms of input devices through which a user can provide input to smart thermostat 110. In some embodiments herein, an outer rotatable ring is present as part of user interface 112. The ring can be rotated by a user clockwise and counterclockwise in order to provide input. The ring can be infinitely rotatable in either direction, thus allowing a user to scroll or otherwise navigate user interface menus. The ring (and, possibly, lens assembly 122) can be pressed inward (toward the rear of smart thermostat 110) to function as a "click" or to make a selection. The outer rotatable ring can, for example, allow the user to make temperature target adjustments. By rotating the outer ring clockwise, the target temperature can be increased, and by rotating the outer ring counterclockwise, the target temperature can be decreased. As another example, the ring can be rotated to highlight displayed icons; an inward click can be provided by a user to select a particular icon.

Radar sensor 113 may be configured to output electromagnetic radiation into the ambient environment in front of electronic display 111 of thermostat 110. Radar sensor 113 may be an integrated circuit that includes one or more antennas, one or more RF emitters, and one or more RF receivers. Radar sensor 113 may be able to detect the presence of a user and the distance at which the user is located. Other details of a user may also be detected, such as velocity and whether the user is facing smart thermostat 110. Radar sensor 113 may use frequency-modulated continuous wave (FMCW) radar. Radar sensor 113 may emit electromagnetic radiation and receive reflected electromagnetic radiation through lens assembly 122. Radar sensor 113 may emit chirps of radar that sweep from a first frequency to a second frequency. Therefore, the waveform output by radar sensor 113 may be a sawtooth waveform. Using receive-side beam steering on the reflected radio waves received using multiple antennas, certain regions may be targeted for sensing the presence of users. For instance, beam steering away from the ground may be performed to avoid pets being potentially incorrectly detected as a user.

Network interface 114 may be used to communicate with one or more wired or wireless networks. Network interface 114 may communicate with a wireless local area network, such as a WiFi network. Additional or alternative network interfaces may also be present. For example, smart thermostat 110 may be able to communicate with a user device directly, such as using Bluetooth or some other device-to-device short-range wireless communication protocol. Thermostat 110 may be able to communicate via a mesh network with various other home automation devices, such as using Thread. Mesh networks may use relatively less power compared to wireless local area network-based communication, such as WiFi. In some embodiments, thermostat 110 can serve as an edge router that translates communications between a mesh network and a wireless local area network, such as a WiFi network. In some embodiments, a wired network interface may be present, such as to allow communication with a local area network (LAN). One or more direct wireless communication interfaces may also be present, such as to enable direct communication with a remote temperature sensor installed in a different housing external and distinct from housing 121. The evolution of wireless communication to fifth generation (5G) and sixth generation (6G) standards and technologies provides greater throughput with lower latency which enhances mobile broadband services. 5G and 6G technologies also provide new classes of services, over control and data channels, for vehicular networking (V2X), fixed wireless broadband, and the Internet of Things (IoT). Thermostat 110 may include one or more wireless interfaces that can communicate using 5G and/or 6G networks.

Speaker 115 can be used to output audio. Speaker 115 may be used to output beeps, clicks, synthesized speech, or other audible sounds, such as in response to the detection of user input via user interface 112.

Ambient light sensor 116 may sense the amount of light present in the environment of thermostat 110. Measurements made by ambient light sensor 116 may be used to adjust the brightness of electronic display 111. In some embodiments, ambient light sensor 116 senses an amount of ambient light through lens assembly 122. Therefore, compensation for the reflectivity of lens assembly 122 may be made such that the ambient light levels are correctly determined via ambient light sensor 116. In some embodiments, a light pipe is present between ambient light sensor 116 and lens assembly 122 such that in a particular region of lens assembly 122, light that is transmitted through lens assembly 122, is directed to ambient light sensor 116, which may be mounted to a printed circuit board (PCB), such as a PCB to which processing system 119 is attached.

One or more temperature sensors 117, may be present within thermostat 110. Temperature sensors 117 may be used to measure the ambient temperature in the environment of thermostat 110. One or more additional temperature sensors that are remote from thermostat 110 may additionally or alternatively be used to measure the temperature of the ambient environment.

Lens assembly 122 may have a transmissivity sufficient to allow illuminated portions of electronic display 111 to be viewed through lens assembly 122 from an exterior of thermostat 110 by a user. Lens assembly 122 may have a reflectivity sufficient such that portions of lens assembly 122 that are not illuminated from behind appear to have a mirrored effect to a user viewing a front of thermostat 110. Further detail regarding lens assembly 122 are provided in relation to FIG. 6.

HVAC interface 118 can include one or more interfaces that control whether a circuit involving various HVAC control wires that are connected either directly with thermostat 110 or with backplate 120 is completed. A heating system (e.g., furnace, boiler, heat pump), cooling system (e.g., air conditioner, heat pump), and/or fan may be controlled via HVAC wires by opening and closing circuits that include the HVAC control wires. In some installations, only a heating system or cooling system is controlled by smart thermostat 110; in other embodiments, smart thermostat 110 may control both a heating system and cooling system.

Processing system 119 can include one or more processors. Processing system 119 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of thermostat 110.

Processing system 119 may output information for presentation to electronic display 111. Processing system 119 can receive information from temperature sensors 117, user interface 112, radar sensor 113, network interface 114, and ambient light sensor 116. Processing system 119 can perform bidirectional communication with network interface 114. Processing system 119 can output information to be output as sound to speaker 115. Processing system 119 can control the HVAC system via HVAC interface 118.

Housing 121 may house and/or attach with all of the components of smart thermostat 110.

Thermostat 110 may be attached (and removed) from backplate 120. Some number of HVAC control wires may be attached with terminals or receptacles of backplate 120. Such HVAC control wires electrically connect backplate 120 with HVAC system 125, which can include a heating system, cooling system, ventilation system, or some combination thereof. Backplate 120 can allow smart thermostat 110 to be attached and removed from backplate 120 without affecting the electrical connections of the HVAC control wires with backplate 120. In other embodiments, such control wires are directly connected with smart thermostat 110. In some embodiments, wall plate 130 may additionally be installed between backplate 120 and a surface, such as a wall, such as for aesthetic reasons (e.g., cover an unsightly hole through which HVAC wires protrude from the wall.)

Network 140 can include one or more wireless networks, wired networks, public networks, private networks, and/or mesh networks. A home wireless local area network (e.g., a Wi-Fi network) may be part of network 140. Network 140 can include the Internet. Network 140 can include a mesh network, which may include one or more other smart home devices, may be used to enable thermostat 110 to communicate with another network, such as a Wi-Fi network. Thermostat 110 may function as an edge router that translates communications from a relatively low power mesh network received from other devices to another form of network, such as a relatively higher power network, such as a Wi-Fi network.

Cloud-based server system 150 can maintain an account mapped to smart thermostat 110. Thermostat 110 may periodically or intermittently communicate with cloud-based server system 150 to determine whether setpoint or schedule changes have been made. A user may interact with thermostat 110 via computerized device 160, which may be a mobile device, smartphone, tablet computer, laptop computer, desktop computer, or some other form of computerized device that can communicate with cloud-based server system 150 via network 140 or can communicate directly with thermostat 110 (e.g., via Bluetooth or some other device-to-device communication protocol). A user can interact with an application executed on computerized device 160 to control or interact with thermostat 110.

Figure 2A:
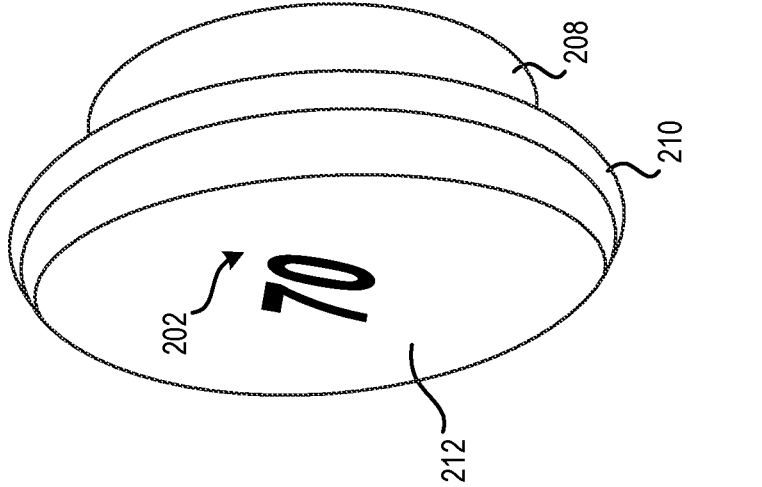
FIG. 2A is an isometric view of a smart thermostat, in accordance with one embodiment of the present disclosure.
Figure 2A:
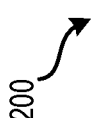

FIG. 2A is an isometric view of an embodiment of a smart thermostat 200. Smart thermostat 200 can represent an embodiment of smart thermostat 110 of FIG. 1. In FIG. 2A, electronic display 202, located behind lens assembly 212, is active in displaying a setpoint temperature. The housing of smart thermostat 200 can define sidewall 208. Sidewall 208 may be generally cylindrical according to various embodiments. A diameter of the sidewall 208 may be smaller than a diameter of the electronic display 202 and ring 210 according to various embodiments and as illustrated in FIG. 2A. Ring 210 can function as detailed in relation to user interface 112. Either attached with housing 121 or attached with components connected with housing 121 is lens assembly 212. Lens assembly 212 may include a reflective layer having a reflectivity such that when the electronic display 202 is not illuminated, lens assembly 212 appears to be a mirror when viewed by a user.

In some embodiments, ring 210 is mounted to lens assembly 212. In other embodiments, ring 210 can be rotated clockwise and counterclockwise independent of lens assembly 212. In some embodiments, housing 121 includes a display frame (not visible in this view) that further supports electronic display 202 and lens assembly 212.

Electronic display 202 is housed behind lens assembly 212 such that, when illuminated, the portion of electronic display 202 that is illuminated is visible through lens assembly 212 by a user. In some embodiments, due to the reflectivity of lens assembly 212, an edge of electronic display 202 is not visible to a user regardless of whether electronic display 202 is illuminated, partially illuminated, or not illuminated. Therefore, the overall effect experienced by a user may be that lens assembly 212 appears as a mirror and portions of electronic display 202, when illuminated, are visible through lens assembly 212.

In various embodiments, around an axis perpendicular to the display face of electronic display 202, the ring 210 has an inner diameter and an outer diameter and both the inner diameter and the outer diameter of ring 210 are larger than a diameter of sidewall 208 of housing 121.

Figure 2C:
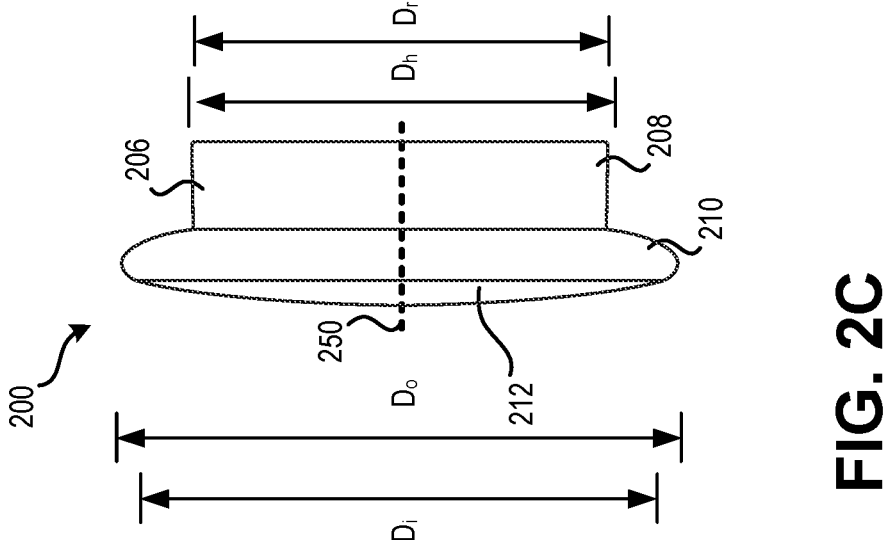
FIGS. 2B and 2C are a front view and a side view of a smart thermostat, in accordance with one embodiment of the present disclosure.
Figure 2B:
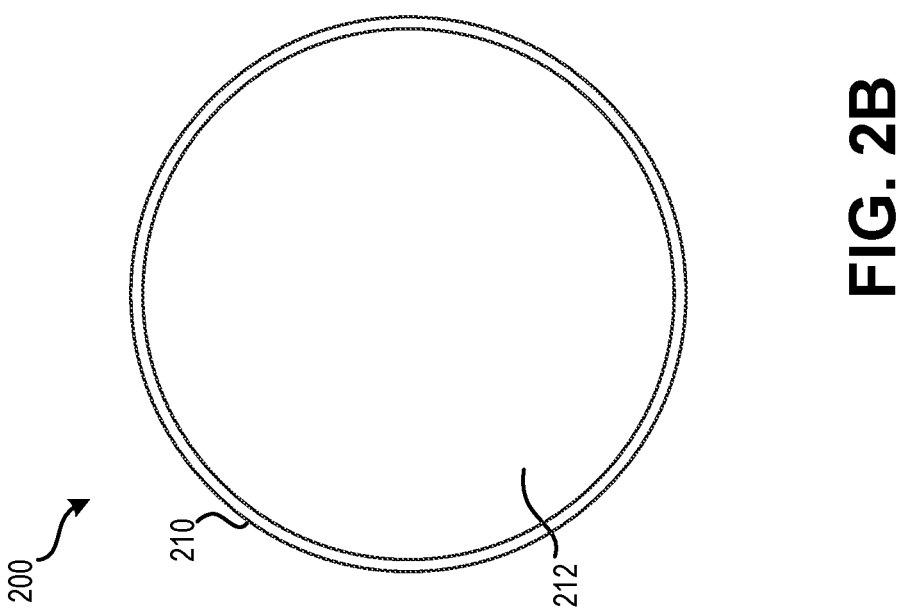

FIG. 2B is a front view of an embodiment of smart thermostat 200. When mounted on a wall or other surface, lens assembly 212 is opposite the portion of smart thermostat 200 that mounts to the wall or other surface. Therefore, when a user is facing mounted smart thermostat 200, lens assembly 212 is visible. Lens assembly 212 can form an uninterrupted circular surface with no gaps, holes, lens, or other discontinuities present on the outermost surface of lens assembly 212. Lens assembly 212 has sufficient transmissivity to allow light emitted by electronic display 202 located within housing 206 to be visible through lens assembly 212. Further, lens assembly 212 may have sufficient reflectivity such that a mirrored effect is present on portions of lens assembly 212 that are not currently being illuminated from behind by electronic display 202.

FIG. 2C is a side view of an embodiment of a smart thermostat. When smart thermostat 200 is mounted to a wall or other surface, sidewall 208 of housing 121 is visible. Around an axis 250, the ring 210 has an inner diameter Di and an outer diameter Do and both the inner diameter Di and the outer diameter Do of the ring 210 are larger than a diameter Dh of sidewall 208 of housing 121. According to various embodiments, sidewall 208 of housing 121 can be generally cylindrical and can have a consistent diameter along a length thereof. Alternatively, a diameter of sidewall 208 can increase as a distance from lens assembly 212 increase.

In some embodiments, ring 210 has a smallest diameter at the rearmost portion of ring 210. Dr is indicative of the diameter of ring 210 where ring 210 meets sidewall 208. This arrangement can help facilitate a user's fingers reaching around ring 210, grasping ring 210, and rotating in either direction. In some embodiments, along axis 250, sidewall 208 may have a diameter of approximately Dr wherein ring 210 and sidewall 208 meet. In some embodiments, the diameter of sidewall 208 can increase as the distance from ring 210 increases.

Figure 3A:
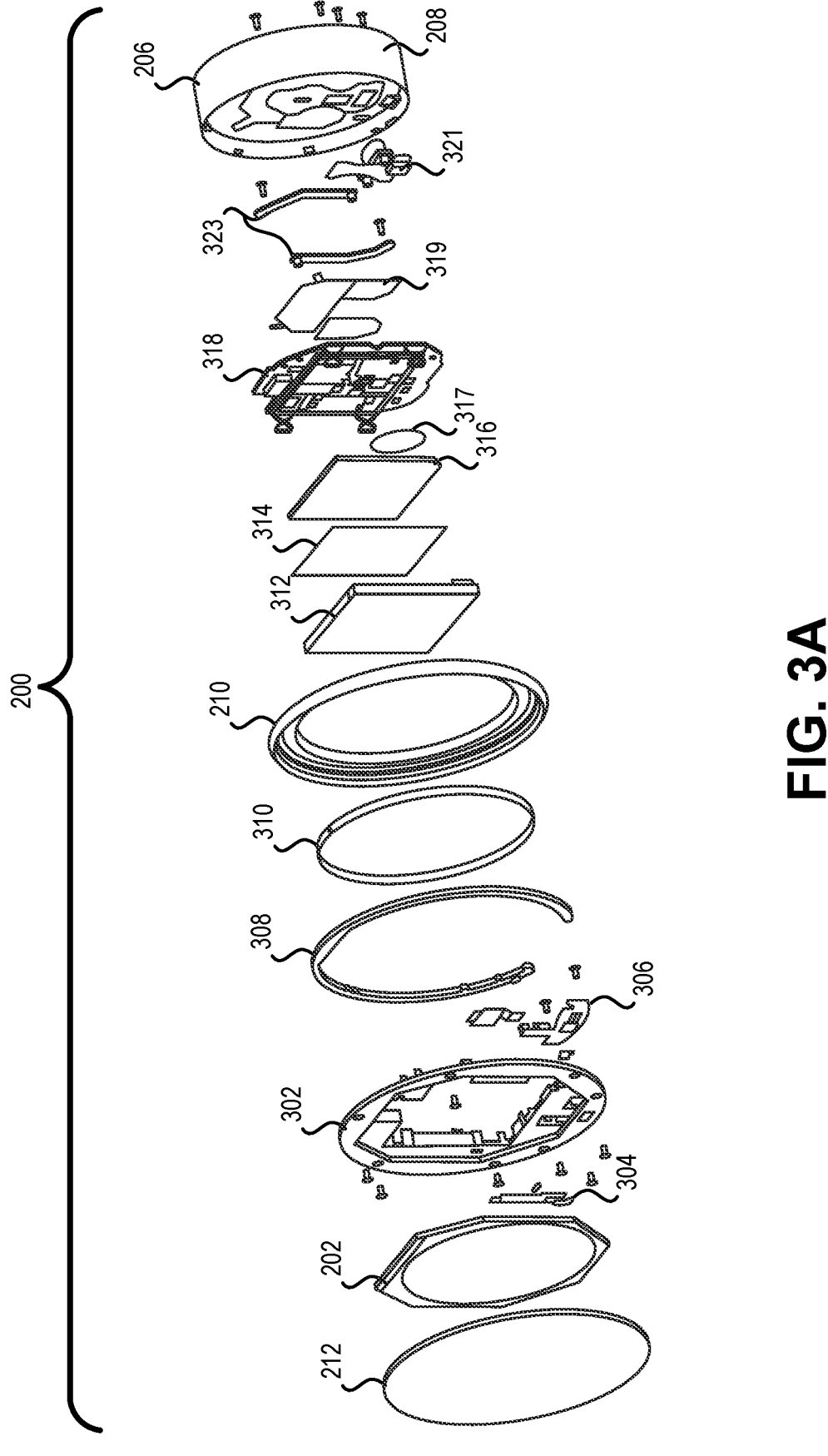
FIG. 3A is an exploded front isometric view of a smart thermostat, in accordance with one embodiment of the present disclosure.
Figure 3B:
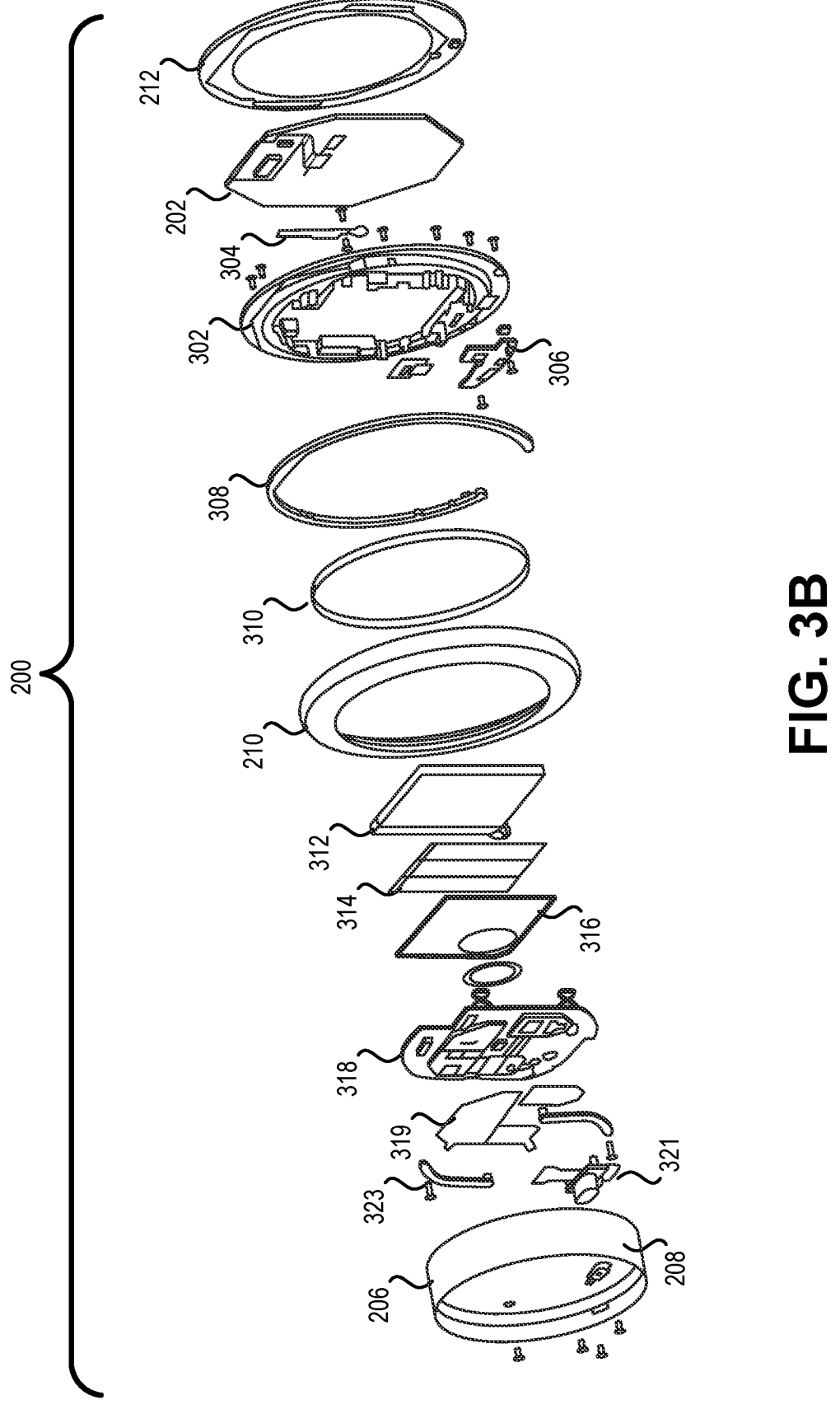
FIG. 3B is an exploded rear isometric view of a smart thermostat, in accordance with one embodiment of the present disclosure.

FIG. 3A is an exploded front isometric view of an embodiment of smart thermostat 200. FIG. 3B is an exploded rear isometric view of smart thermostat 200. Viewing the components of the smart thermostat 200 left to right, lens assembly 212 forms an outermost domed surface of smart thermostat 200. Adjacent lens assembly 212 may be electronic display 202. Electronic display 202 may be a liquid-crystal display (LCD) or organic light emitting diode (OLED) display according to various embodiments. In at least some embodiments, one or more adhesives may be used to attach electronic display 202 with lens assembly 212.

Smart thermostat 200 further includes one or more antenna assembly 304 for communicating with a network and/or other electronic devices. Antenna assembly 304 can be used for communicating with wireless local area networks (e.g., WiFi), device-to-device communication (e.g., Bluetooth), and/or communicating with mesh networks (e.g., Thread). Smart thermostat 200 includes one or more sensor boards, such as sensor daughterboard 306. One or more temperature sensors may be installed on sensor daughterboard 306. Use of sensor daughterboard 306 can help isolate the one or more temperature sensors from heat generated by other components.

Smart thermostat 200 may further include clip 308 for coupling ring 210 and display frame 302 supporting electronic display 202. Clip 308 may act as an axial constraint for smart thermostat 200. In particular, clip 308 prevents electronic display 202, display frame 302, and ring 210 from decoupling from one another in the assembled configuration. Clip 308 maintains each of the electronic display 202, display frame 302, and ring 210 relative to a longitudinal axis of the smart thermostat.

As shown in FIG. 3A, smart thermostat 200 can include magnetic strip 310. According to various embodiments, ring 210 rotates relative to sidewall 208 of housing 206 and a backplate when smart thermostat 200 is mounted to a surface. In various embodiments, a sensor installed on a sensor board, such as sensor board 306 and magnetic strip 310 are used for detecting rotation of the ring 210 during use.

According to various embodiments, ring 210 is mounted to housing 206 such that ring 210 can be rotated clockwise and counterclockwise. Ring 210 may include polished stainless steel and a finish applied using physical vapor deposition (PVD). Ring 210 further advantageously provides an aesthetic appearance as the finish of the ring 210 appears seamless relative to lens assembly 212 having a mirrored effect.

Further internal components of smart thermostat 200 include battery 312 and battery adhesive 314. Battery 312 can be a secondary battery and can provide power to the various components of smart thermostat 200, including electronic display 202 and processing system 119. Battery adhesive 314 may be used to adhere battery 312 within housing 206 although the battery 312 (or any other components of the smart thermostat 200) may be secured within the housing 206 using other means. For example, various components may be secured using adhesives, screws, wires, clips, or the like.

Smart thermostat 200 includes processing system 316. According to some embodiments, processing system 316 is a system-on-a-chip (SoC) including various processing parts, memory, modems, etc. Processing system 316 may be in electric communication with one or more antennas present on antenna assembly 304, sensor board 306, electronic display 202, etc., for performing various functions of the smart thermostat 200 and outputting results based on user input (e.g., in response to the user rotating the ring 210 and/or user input via an external mobile device). Adjacent processing system 316 may be piezo sensor 317 for detecting any movement of the smart thermostat 200 (e.g., in the case the smart thermostat 200 becomes dismounted or the like). Additional components of the processing system 316 or components that work with processing system 316 are also shown in FIG. 3. For example, multi-layer board (MLB) 318 may be provided for performing various functions of smart thermostat 200, in a manner that would be appreciated by one having ordinary skill in the art. In some embodiments, MLB 318 may include a Universal Serial Bus (USB) port for electrically coupling smart thermostat 200 to another electronic device for various updates, servicing, or the like. Various springs 319 for supporting components, flexes 321 for enabling flexible and high-density intercon-nects between printed circuit boards (PCBs), LCDs, etc., and additional links 323 may also be included in the internal components of smart thermostat 200.

Smart thermostat 200 may include more or fewer com-ponents than those shown in FIG. 3A. In various embodi-ments, the components may be in one or more configurations other than the configuration shown in FIG. 3A. Advanta-geously, various components of smart thermostat 200 are optimized to be condensed into housing 206 such that the overall side profile of smart thermostat 200 is significantly thinner than a side profile of other commercially available smart thermostats.

Figure 4B:
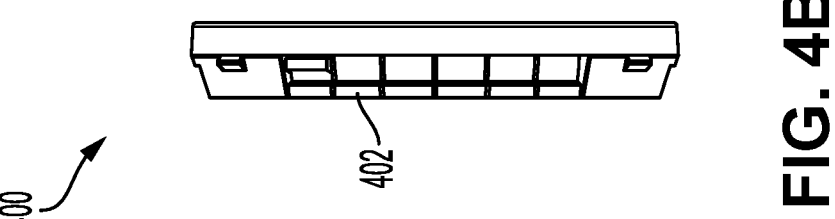
FIGS. 4A and 4B are a front view and a side view of a smart thermostat backplate, in accordance with one embodiment of the present disclosure.
Figure 4A:
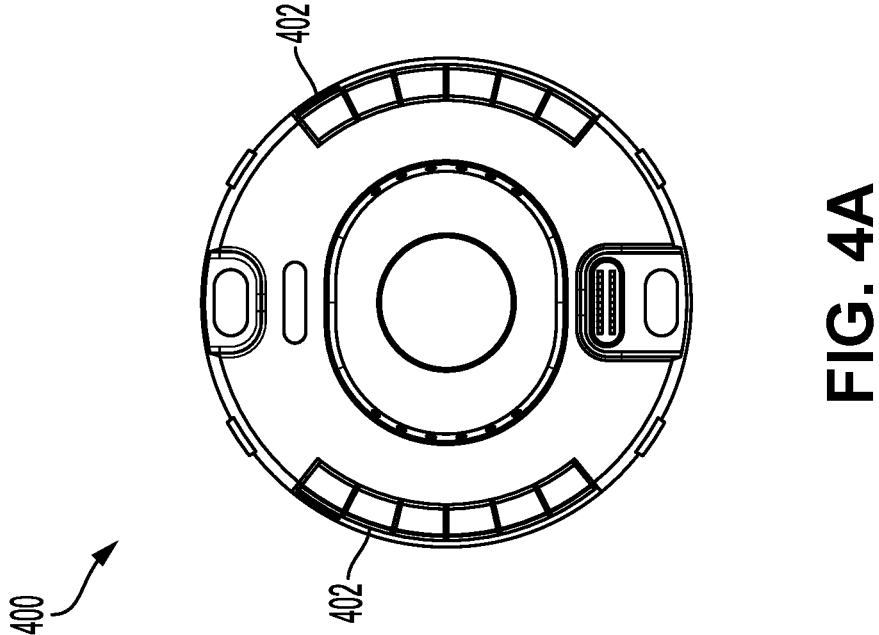

FIGS. 4A and 4B are a front view and a side view of a smart thermostat backplate. According to various embodi-ments, an electronic device, such as smart thermostat 200 described in detail above, may be mounted to a wall or other surface by a backplate 400. The backplate 400 may include a plurality of wire terminals 402 for receiving wires that are connected with a heating, ventilation, and cooling (HVAC) system. For example, the backplate 400 may include mul-tiple receptacles, with each receptacle designated to receive a particular HVAC control wire. Backplate 400 can define one or more holes configured to receive fasteners or the like for securing backplate 400 and, if being used, a trim plate or the like, to a surface, such as a wall. The backplate 400 can removably attached with the thermostat housing, such as thermostat housing 206 described above.

In some embodiments, a smart thermostat may be attached (and removed) from backplate 400. HVAC control wires may be attached with terminals or receptacles of backplate 400. Alternatively, such control wires may be directly connected with the smart thermostat. In some embodiments, a trim plate may additionally be installed between the backplate 400 and a surface, such as a wall, such as for aesthetic reasons (e.g., cover an unsightly hole through which HVAC wires protrude from the wall).

Figure 4C:
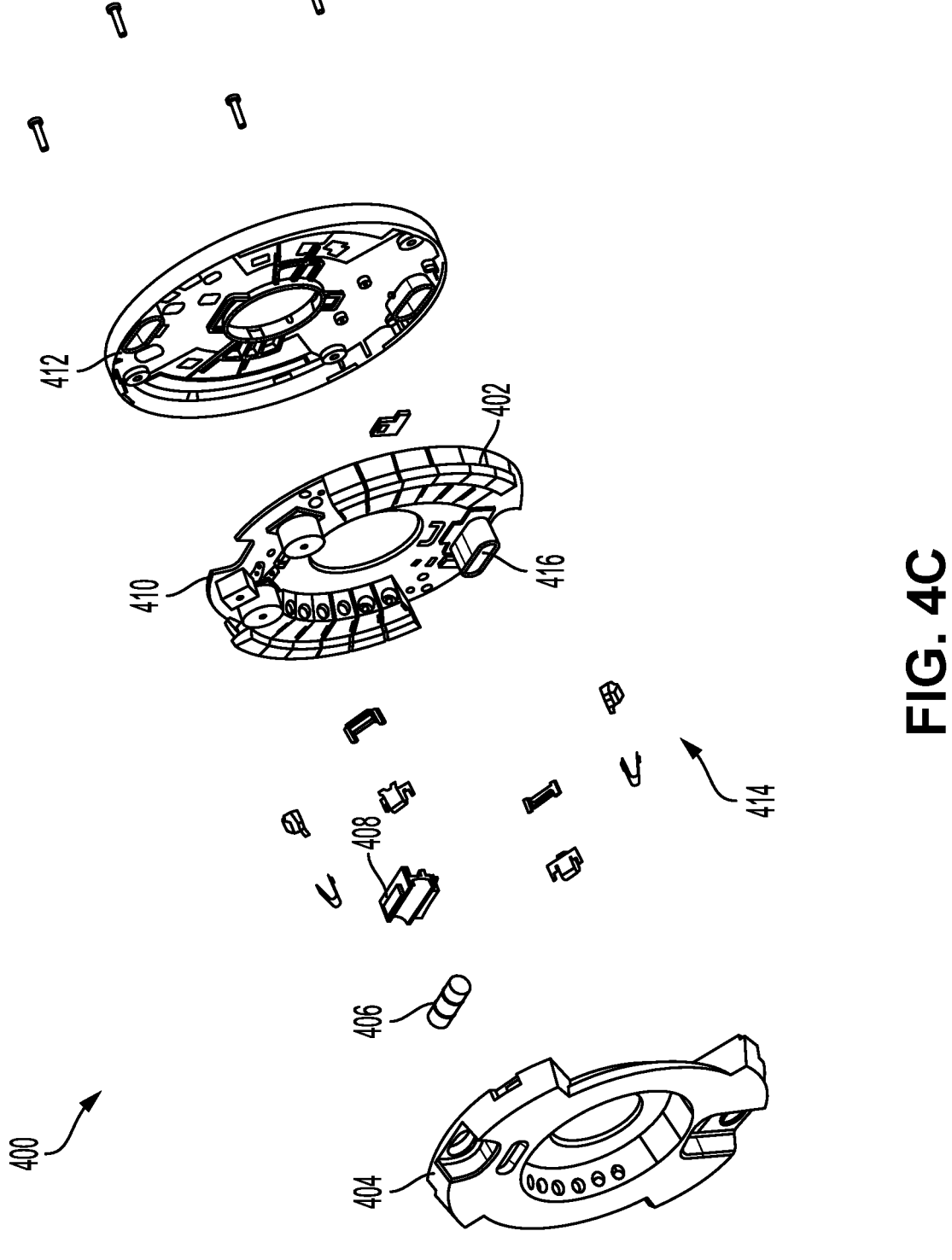
FIG. 4C is an exploded front isometric view of a smart thermostat backplate, in accordance with one embodiment of the present disclosure.

FIG. 4C is an exploded front isometric view of the smart thermostat backplate of FIGS. 4A and 4B. Visible in this view, the backplate 400 includes a cap 404, a level 406, a level holder 408, and a coupling plate 410. Various compo-nents of the backplate 400 are coupled to one another with one or more fasteners 414. Fasteners 414 may be screws, nails, or some other form of fastener. Fasteners 414 can securely hold backplate 400 and, possibly, a trim plate (not shown) to a surface, such as a wall. A thermostat may removably attach with backplate 400. A user may be able to attach thermostat to backplate 400 by pushing thermostat against backplate 400. Similarly, a user can remove the thermostat from backplate 400 by pulling the thermostat away from backplate 400. When the thermostat is connected with backplate 400, the thermostat is electrically connected various HVAC control wires that have been connected with the receptacles of backplate 400 as would be appreciated by one having ordinary skill in the art.

Further visible in FIG. 4C, a cap 404 for protecting various internal components from damage and for providing an aesthetically pleasing appearance when the electronic device is not mounted to the backplate 400. The cap 404 covers a level 406 for properly mounting the electronic device and/or the backplate 400 to a surface. For example, it would be desirable to have text displayed on the electronic display of the smart thermostat to be straight across (e.g., perpendicular to the ground, etc.). The level 406 may be a bubble level in at least some embodiments. A level holder 408 may be provided to align the level 406 relative to the cap 404, a coupling plate 410, and a base 412. Additional coupling mechanisms may be provided including adhesives, screws, snaps, wires, or the like. The coupling plate 410 may include one or more fasteners as described in detail above. The coupling plate 410 may further include a board-to-board (BTB) connector 416 in some embodiments.

The backplate 400 may include more or less components than those shown in FIGS. 4A-4C. In various embodiments, the components may be in one or more configurations other than the configuration shown in FIGS. 4A-4C. For example, the backplate 400 may be part of a greater thermostat mounting system including a trim plate, batteries, various fasteners, sensors, or the like.

Figure 5:
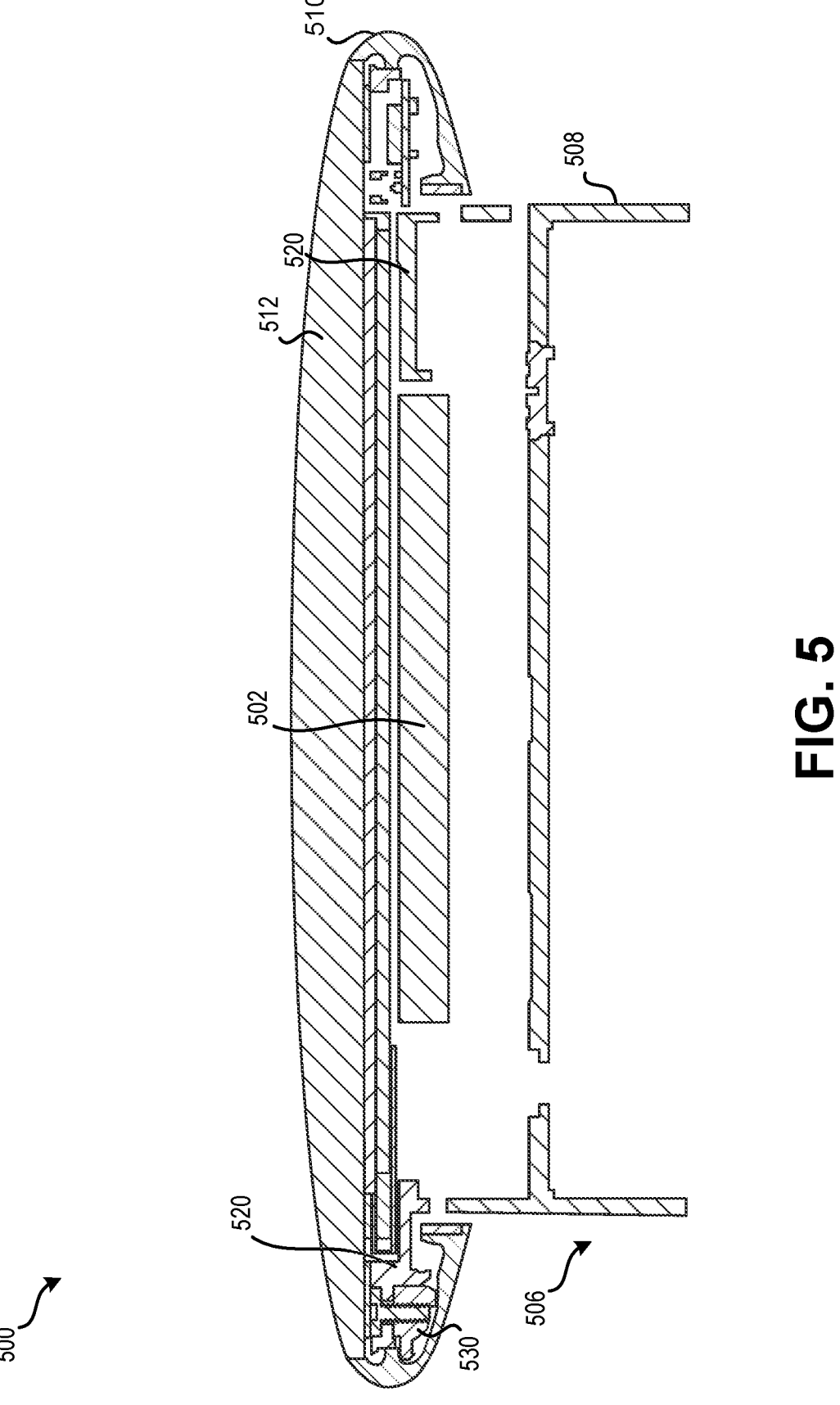
FIG. 5 is a cross section of a side view of a smart thermostat, in accordance with one embodiment of the present disclosure.

FIG. 5 is a cross section of a side view of a smart thermostat. Smart thermostat 500 may be similar to smart thermostat 200 and similar components may be similarly numbered and have similar form and function unless other-wise noted herein. The domed profile of a domed lens 512 is visible in the cross section of FIG. 5. An electronic display 502 is disposed under the domed lens 512 and surrounded by a ring 510. The electronic display 502 is supported by a display frame 520 as described in detail above. In particular, the ring 510 surrounds the domed lens 512 and couples to the housing 506 having sidewall 508. A clip 530 couples the display frame 520 and the ring 510 as described with respect to other embodiments.

Figure 6:
FIG. 6 is an enlarged cross section of a side view of a smart thermostat, in accordance with one embodiment of the present disclosure.
Figure 6:
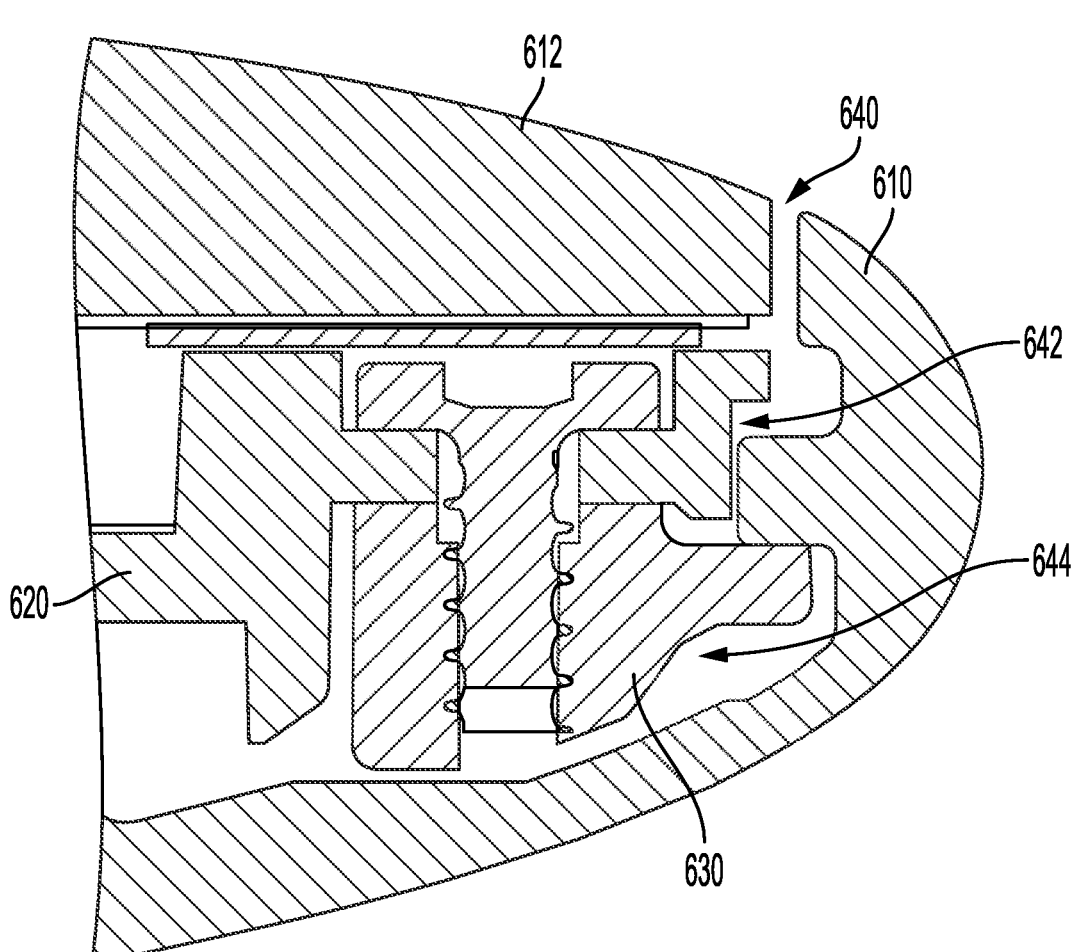

FIG. 6 is an enlarged cross section of a side view of a smart thermostat. Electronic device 600 may be similar to smart thermostat 200 and smart thermostat 500. Similar components may be similarly numbered and have similar form and function unless otherwise noted herein. As shown in FIG. 6, the clip 630, the display frame 620, and the ring 610 are assembled such that a gap 640 is formed between an outer perimeter of the domed lens 612 and a corresponding internal perimeter of the ring 610. In various embodiments, the gap 640 is not visible to the user facing the electronic device 600. For example, the mirrored reflective cover of the domed lens 612 smoothly transitions to the polished finish of the ring 610 with no disruptions. The gap 640 is optimized to be as small as possible while enabling the ring 610 to be rotated relative to the domed lens 612 and/or the electronic display (not shown in this view).

According to various embodiments, the display frame 620 includes a grease trap recess 642 for directing grease between the display frame 620 and the clip 630. For example, grease may be applied between a vertical interface (such as formed by the grease trap recess 642) of the display frame 620 and the ring 610 for continuous rotation of the ring 610 relative to the rest of the electronic device 600 (e.g., including the sidewall of the housing and the backplate) without disruption. In exemplary embodiments, a grease is applied such that the user experiences a pleasing, viscous feeling when rotating the ring 610. The grease may include a damping grease and/or a dry grease. Different types of grease may be applied at different regions between the components unless otherwise noted herein.

In at least some embodiments, the clip 630 is formed to reduce grease shearing between the clip 630 and the ring 610 at location 644. For example, grease applied at the grease trap recess 642 may be displaced to an area proximate location 644. The combination of the tuned gap 640 and grease application enhances the user experience during rotation of the ring 610 and selection of various icons and/or information displayed on the electronic display when the information is visible (e.g., when the electronic display is "ON") through the domed lens 612.

In various embodiments, one or more temperature sensors (not shown) may be disposed between the ring 610 and the clip 630 and/or the display frame 620. For example, the one or more temperature sensors may be disposed in the portion of the electronic device 600 that overhangs the sidewall (not shown) that mounts the electronic device 600 to a mounting surface. Said another way, the electronic device 600 may form a "mushroom" shape and one or more temperature sensors are disposed proximate an outer perimeter of the "cap" of the mushroom.

Figure 7:
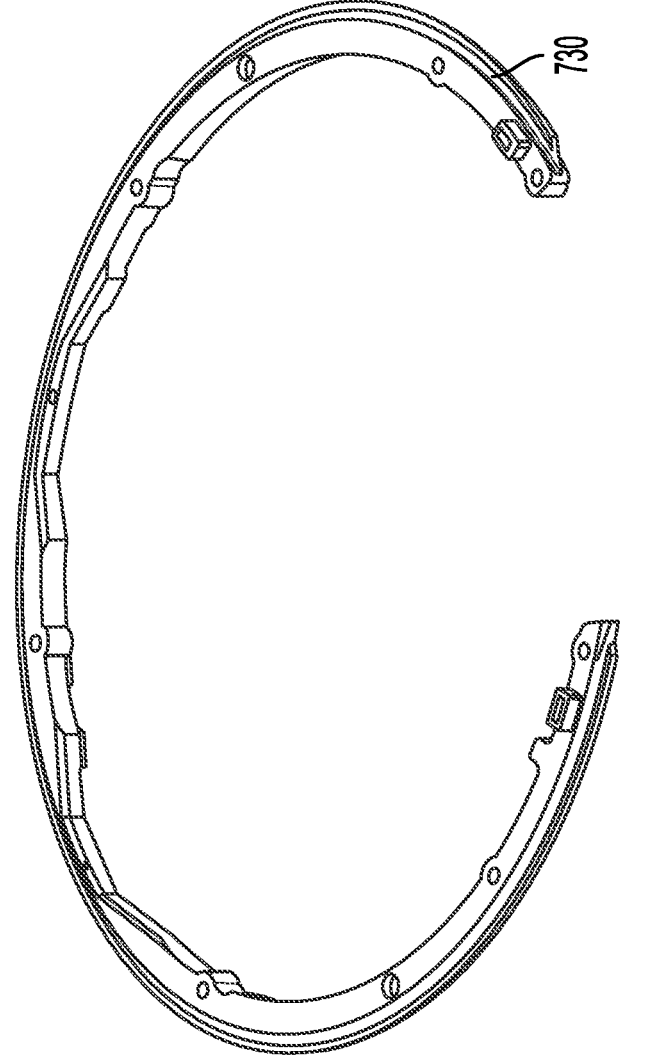
FIG. 7 is clip for use with a smart thermostat, in accordance with one embodiment of the present disclosure.

FIG. 7 is clip for use with a smart thermostat. The clip 730 may be of the same type as various clips described herein. The clip 730 may be a C-clip as shown in FIG. 7. The clip 730 acts as an axial constraint for various components of the electronic device and couples at least the display frame and the ring. The clip 730 is optimized for assembly such that the clip 730 is relatively thin within the electronic device housing. The open end of the clip 730 as shown in FIG. 7 enables efficient installation and removal of the clip 730 during servicing or other activities involving disassembling the electronic device.

Figure 8:
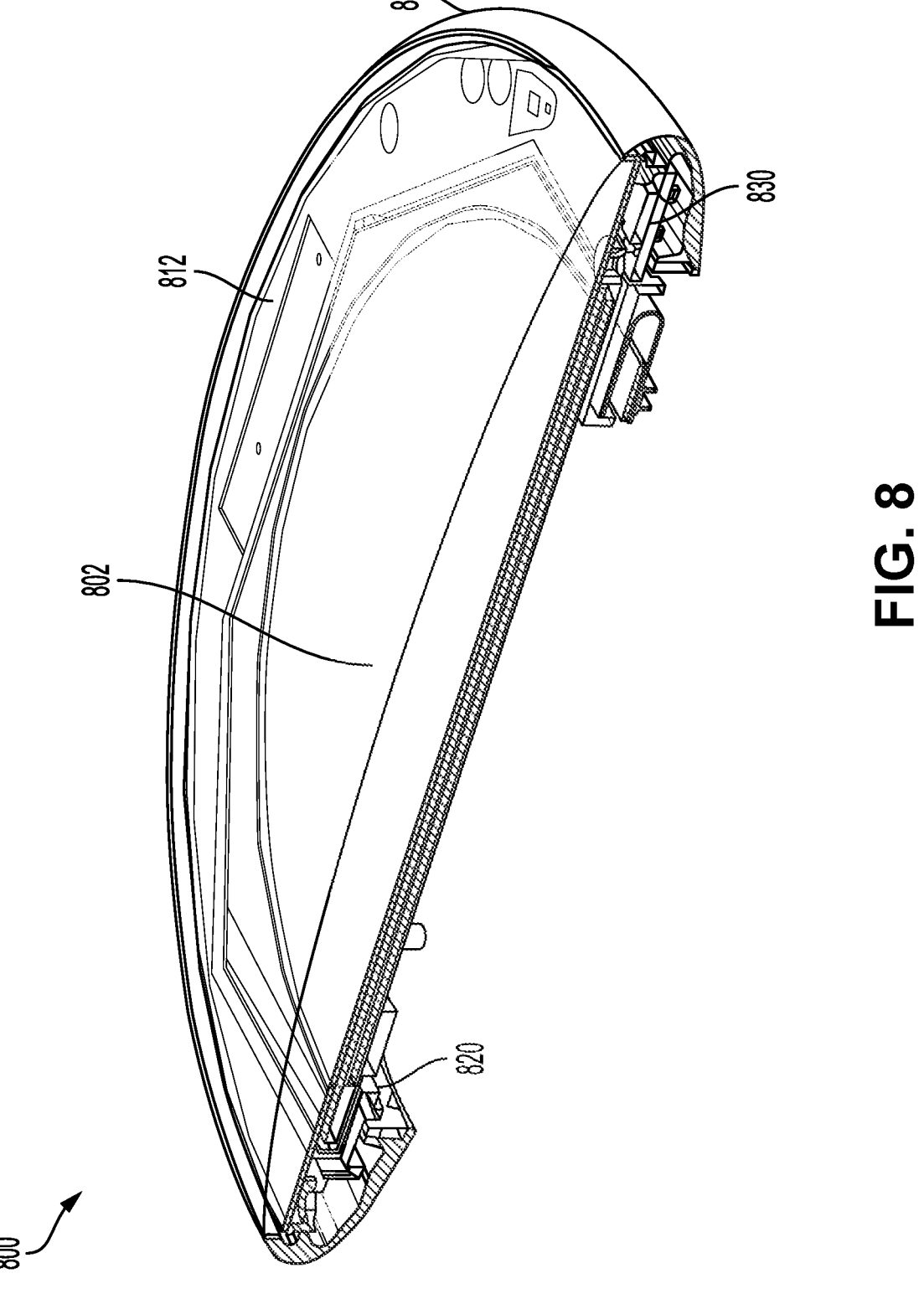
FIG. 8 is an isometric cross section of a side view of a smart thermostat, in accordance with one embodiment of the present disclosure.

FIG. 8 is an isometric cross section of a side view of a smart thermostat. FIG. 8 provides another view of the various electronic devices described in detail above. In particular, electronic device 800 may be similar to other electronic devices described above and similar components may be similarly numbered and have similar form and function unless otherwise noted herein. The domed profile of a domed lens 812 is visible in the cross section of FIG. 8. An electronic display 802 is disposed under the domed lens 812 and supported by a ring 810 and a display frame 820 as described in detail above. In particular, the ring 810 surrounds the domed lens 812. The clip 830 couples the display frame 820 supporting the electronic display 802 to the housing (not shown).

Figure 9:
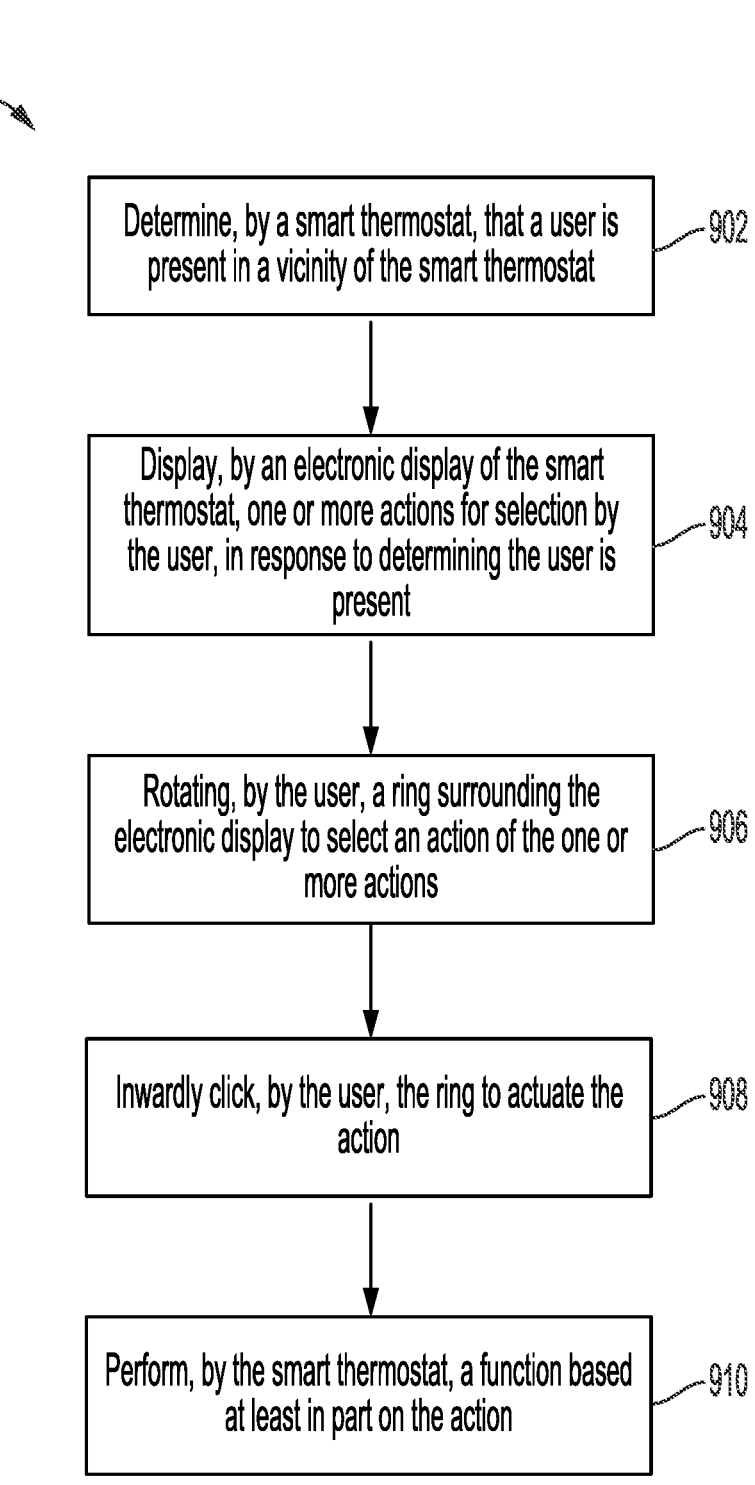
FIG. 9 is a flowchart of a method, in accordance with one embodiment of the present disclosure.

FIG. 9 is a flowchart of a method, in accordance with one embodiment of the present disclosure. In particular, FIG. 9 illustrates a method 900 for interacting with a smart thermostat such as the electronic devices described in detail above. Method 900 includes step 902. Step 902 includes determining, by a smart thermostat, that a user is present in a vicinity of the smart thermostat. The smart thermostat may include any of the embodiments described in detail above.

Step 904 includes, displaying, by an electronic display of the smart thermostat, one or more actions for selection by the user, in response to determining that the user is present in the vicinity of the smart thermostat. For example, a user interface may become visible through a reflective cover covering the electronic display. The reflective cover may be a domed lens secured relative to the housing of the smart thermostat. The reflective cover may have a reflectivity sufficient to produce a mirrored effect when viewed and a transmissivity sufficient to allow illuminated portions of an electronic display of the smart thermostat to be visible when viewed through the reflective cover.

Method 900 may further include step 906. Step 906 includes rotating, by the user, a ring surrounding the electronic display to select an action of the one or more actions. For example, the electronic display may display thermostat, a plurality of icons, text, images, or the like, that are indicative of various actions to be performed by the smart thermostat. A user can interact with presented menus, icons, and other data presented on the electronic display. Action may be used interchangeably with menus, icons, and other data as would be appreciated by one having ordinary skill in the art upon reading the present disclosure. Icons or graphics may be used to indicate at least some information graphically. For example, weather information may be indicated using graphics such as the sun, clouds, rain, snow, wind, etc. A graphic indicating a temperature that corresponds to the indoor temperature may include a graphic of a house. A graphic indicating the relative humidity may be a raindrop. The user may rotate the ring, as described in detail above, to select an action of the one or more actions.

Method 900 may further include step 908. Step 908 includes inwardly clicking, by the user, the ring to actuate the action. For example, the ring may be separate from the electronic display such that the ring may be rotated and inwardly clicked without rotating the display. Step 908 may include receiving, by the smart thermostat, user input via rotation of a ring surrounding the electronic display for selecting an icon. A ring as described in detail above may be rotated to select one or more icons, a series of icons, etc., on the electronic display. In at least some embodiments, the smart thermostat may receive additional user input from a user tap or push gesture of the domed lens including the electronic display. In yet other embodiments, the smart thermostat may receive additional user input from a user's swipe gesture across the domed lens. In some embodiments, color is used to emphasize the selected icon. In order to return back to the default interface, a user may highlight and select a back icon, which in some embodiments is represented by an arrow pointed left. Selection of an icon may be accomplished by a user tapping a touch sensor or the like while the icon is emphasized.

Method 900 may further include step 910. Step 910 includes performing, by the smart thermostat, a function based at least in part on the selection of the icon. A function of the smart thermostat may include activating an HVAC system, deactivating an HVAC system, adjusting a control schedule used to control the HVAC system, adjusting a setpoint of the HVAC system, altering settings of the thermostat, etc.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A smart thermostat, comprising:
a housing having a front side, a rear external side adapted to be attached to a mounting surface, and an outer sidewall extending from the front side to the rear external side;
a domed lens having a convex shape;
a ring comprising a front portion and a rear portion, wherein the front portion is coupled to the domed lens and the rear portion is mounted to the front side of the housing, such that the housing extends beyond the rear portion of the ring to the mounting surface;
a wireless network interface disposed in the housing;
an electronic display disposed in the ring such that the electronic display is visible through the domed lens; and
a processing system, comprising one or more processors, disposed in the housing, that is in communication with the wireless network interface and the electronic display.

2. The smart thermostat of claim 1, wherein the smart thermostat further comprises one or more temperature sensors, housed by the housing, in communication with the processing system.

3. The smart thermostat of claim 1, further comprising a display frame disposed in the ring and a clip for coupling the ring and the display frame, the clip acting as an axial constraint for the smart thermostat.

4. The smart thermostat of claim 3, wherein the clip, the display frame, and the ring are assembled such that a gap is formed between an outer perimeter of the domed lens and a corresponding internal perimeter of the ring.

5. The smart thermostat of claim 3, wherein the display frame includes a grease trap recess for directing grease between the display frame and the clip.

6. The smart thermostat of claim 3, wherein the ring rotates relative to the sidewall and the housing when the smart thermostat is mounted to the surface for selecting one or more icons displayed on the electronic display.

7. The smart thermostat of claim 1, wherein the ring includes an inner diameter and an outer diameter, wherein both the inner diameter and the outer diameter are larger than a diameter of the sidewall of the housing.

8. The smart thermostat of claim 6, further comprising: a sensor board and a magnetic strip for detecting rotation of the ring.

9. The smart thermostat of claim 6, further comprising grease applied between a vertical interface of the display frame and the ring for continuous rotation of the ring relative to the sidewall and the backplate without disruption.

10. The smart thermostat of claim 1, wherein the ring includes polished stainless steel and a finish applied using physical vapor deposition (PVD).

11. The smart thermostat of claim 1, wherein the domed lens is a reflective cover positioned such that the electronic display is viewed through the reflective cover.

12. The smart thermostat of claim 11, wherein the reflective cover is continuous over an entirety of the domed lens such that no gaps, holes, lenses, or other discontinuities are present within the domed lens.

13. The smart thermostat of claim 11, wherein the ring is inwardly clickable for selecting an action displayed on the electronic display.

14. The smart thermostat of claim 13, wherein selecting the action includes rotating the ring to select the action and inwardly clicking the ring to actuate the action.

15. A method for interacting with a smart thermostat, comprising:
determining, by a smart thermostat mounted on a mounting surface, that a user is present in a vicinity of the smart thermostat, wherein the smart thermostat comprises an electronic display surrounded by a ring mounted on a housing having a front side, rear external side, and an outer sidewall extending between the front side and the rear external side, wherein the housing holds a processing system and extends between the ring and the mounting surface;
activating the electronic display in response to determining that the user is present in the vicinity of the smart thermostat, such that a user interface is visible through a reflective cover covering the electronic display;
displaying, by the electronic display, a plurality of icons;
receiving, by the smart thermostat, user input via rotation of the ring surrounding the electronic display for selecting an icon and an inward clicking of the ring, wherein the ring comprises a first diameter and a second diameter, the second diameter being smaller than the first diameter; and
performing, by the smart thermostat, a function based at least in part on the selection of the icon.

16. The method of claim 15, wherein the ring rotates relative to the electronic display when the smart thermostat is mounted to a surface for selecting one or more icons displayed on the electronic display.

17. The method of claim 15, wherein the reflective cover has a reflectivity sufficient to produce a mirrored effect when viewed and a transmissivity sufficient to allow illuminated portions of an electronic display of the smart thermostat to be visible when viewed through the reflective cover.

18. The method of claim 15, wherein an edge of the electronic display is not visible through the reflective cover.

19. The smart thermostat of claim 7, wherein the front portion of the ring is defined by the inner diameter and the rear portion of the ring defined by a rearmost diameter, wherein the rearmost diameter is smaller than the inner diameter and the diameter of the sidewall of the housing.

20. The smart thermostat of claim 1, wherein the wireless network interface and the processing system are not disposed in the ring.

* * * * *